United States Patent [19]

Tsujiuchi et al.

[11] Patent Number: 5,105,466
[45] Date of Patent: Apr. 14, 1992

[54] METHOD AND APPARATUS FOR DETECTING CORRESPONDING REGIONS BETWEEN PICTURE IMAGES

[75] Inventors: Junpei Tsujiuchi, Kawasaki; Shigeto Ikeda, Tokyo; Toshio Honda, Yokohama; Nagaaki Ohyama, Kawasaki; Susumu Kikuchi, Tokyo, all of Japan

[73] Assignee: Olympus Optical Co., Ltd., Tokyo, Japan

[21] Appl. No.: 474,252

[22] Filed: Feb. 5, 1990

Related U.S. Application Data

[63] Continuation of Ser. No. 100,859, Sep. 25, 1987, abandoned.

[30] Foreign Application Priority Data

Sep. 26, 1986 [JP] Japan ................................ 61-227451
Jun. 11, 1987 [JP] Japan ................................ 62-145529

[51] Int. Cl.⁵ ............................................. G06K 9/00
[52] U.S. Cl. ....................................... 382/1; 382/17; 358/80; 364/526
[58] Field of Search ............. 364/526; 382/1, 17, 382/18; 358/27, 29, 31, 80, 98, 296

[56] References Cited

U.S. PATENT DOCUMENTS

| | | | |
|---|---|---|---|
| 4,075,662 | 2/1978 | Gall | 358/80 |
| 4,314,274 | 2/1982 | Atoji et al. | 358/80 |
| 4,621,284 | 11/1986 | Nishioka et al. | 358/98 |
| 4,654,720 | 3/1987 | Tozawa | 358/80 |
| 4,654,795 | 3/1987 | Shimoni | 364/413.13 |
| 4,731,671 | 3/1988 | Alkofer | 358/80 |
| 4,962,540 | 10/1990 | Tsujiuchi et al. | 382/17 |
| 4,979,225 | 12/1990 | Tsujiuchi et al. | 382/17 |

FOREIGN PATENT DOCUMENTS

| | | |
|---|---|---|
| 3000918A1 | 1/1980 | Fed. Rep. of Germany . |
| 3318303A1 | 5/1983 | Fed. Rep. of Germany . |
| 2620767C2 | 1/1986 | Fed. Rep. of Germany . |
| 61-71791 | 4/1986 | Japan . |

*Primary Examiner*—David K. Moore
*Assistant Examiner*—Jose L. Couso
*Attorney, Agent, or Firm*—Armstrong, Nikaido, Marmelstein, Kubovcik & Murray

[57] ABSTRACT

The method of detecting corresponding regions between a plurality of pictue images includes respective steps of standardizing the concentration values of respective picture image signals in the operation object regions of a plurality of picture images so that an influence such as the dispersion of the concentration and brightness may be corrected, operating the correlation in the actual fields of the operation object regions and detecting the set of regions in which the operated correlation value is a maximum. The apparatus for realizing this method includes a standardizing device for standardizing the concentration values of respective picture image signals in the operation object regions of a plurality of picture images so that the influence such as the dispersion of the concentration and brightness may be corrected, a correlation operating device for operates the correlations in the actual fields of the operation object regions. A corresponding region detecting device detects the set of regions in which the correlation value operated by the correlation operating device is a maximum.

17 Claims, 9 Drawing Sheets

METHOD AND APPARATUS FOR DETECTING CORRESPONDING REGIONS BETWEEN PICTURE IMAGES

This application is a continuation of application Ser. No. 100,859 filed Sept. 25, 1987 now abandoned.

FIELD OF THE INVENTION

This invention relates to a method and apparatus for detecting corresponding regions between picture images whereby corresponding regions can be more simply and precisely detected between a plurality of picture images.

RELATED ART STATEMENT:

The picture image information which can hold a variety of information has recently come to be used in a wide range of fields.

In a multi-dimensional picture image formed of a plurality of thick and thin picture images represented by remote sensing picture images and color picture images, the form distribution in the actual field of each of thick and thin picture images shall be considered. When regions corresponding to each other within these thick and thin picture images and three primary color picture images are to be detected between different picture images, heretofore, for example, a correlating operation has been made to find a region in which a correlation value is a maximum. A phase correlating method mentioned, for example, in the Proceeding ICASSP 86, Vol. 3, 1785-1788 (1986) can be enumerated as such a method. With this phase correlating method, with a color picture image formed of three primary colors of red, green and blue, when the positions of the corresponding picture elements of the respective primary color picture images are displaced, the corresponding region is detected to correct the displacement of the positions.

According to this phase correlating method, it is possible to detect the corresponding region with high precision. However, with this phase correlating method, the Fourier conversion and reverse Fourier conversion must be made for each of the object regions. The number of calculations is so large that, in order to reduce the processing time, a special large dedicated curcuit is required which creates a practical problem.

If the correlating operation is to be made in the actual field without making the Fourier conversion, differences in the concentration (i.e., density or gray level) and brightness such as the illumination fluctuation and shadow will have an influence and no favorably result will be obtained in some cases.

OBJECTS AND SUMMARY OF THE INVENTION

An object of the present invention is to provide a method and apparatus for detecting corresponding regions between picture images whereby corresponding regions can be more simply detected between a plurality of picture images.

Another object of the present invention is to provide a method and apparatus for detecting corresponding regions between picture images whereby corresponding regions can be precisely detected by reducing the influence of the concentration (i.e., density or gray level) and brightness between a plurality of picture images.

In the present invention, the concentration values of the respective picture image signals in the operation object regions of a plurality of picture images are standardized so that an influence such as the dispersion of the concentration and brightness may be corrected. The correlation in the actual field is operated from these standardized concentration values and a set of regions in which this operated correlation value is a maximum is detected to detect corresponding regions.

The concentration values of the respective picture image signals in the operation object regions of a plurality of picture images are standardized so than an influence such as the dispersion of the concentration and brightness may be corrected. Then a correlating operation is made so that the influence of the dispersion of the concentration and brightness, which is a factor of reducing the precision when making a correlating operation in the actual field, can be reduces and the corresponding regions can be precisely detected by a simple means such as the correlating operation in the acutal field.

The other features and advantages of the present invention will become apparent enough with the following explanation.

BRIEF DESCRIPTION OF THE DRAWINGS

FIGS. 1 to 3 relate to the first embodiment of the present invention.

FIGS. 4 and 5 relate to the second embodiment of the present invention.

FIGS. 6 to 8 relate to the third embodiment of the present invention.

FIGS. 9 to 11 relate to the fourth embodiment of the present invention.

FIG. 11($a$) is an explanatory view of a G picture image and B a picture image. FIG. 11($b$) is an explanatory view of an R picture image.

Figure 1:
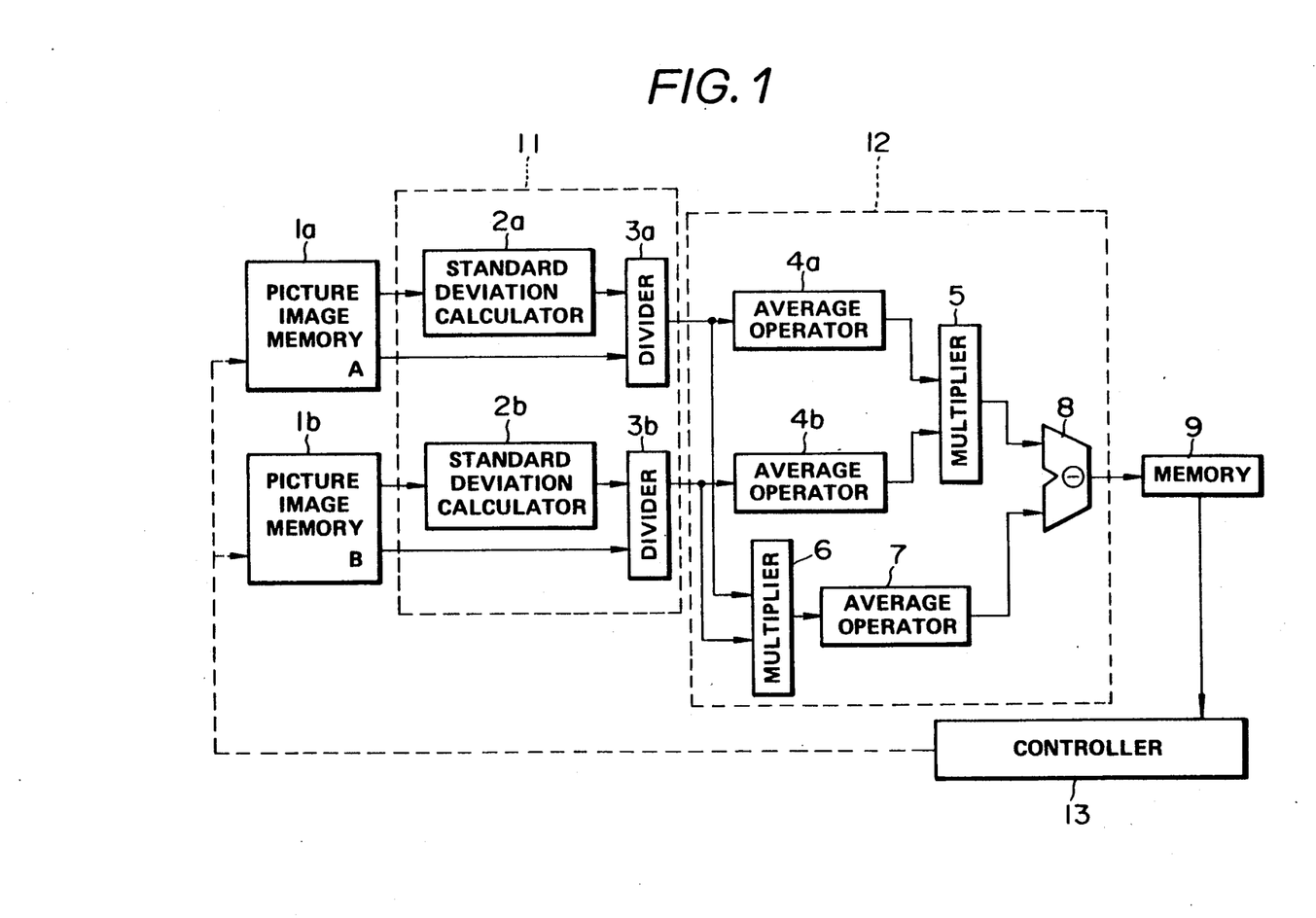
FIG. 1 is a formation diagram of a circuit realizing this embodiment.
Figure 2:
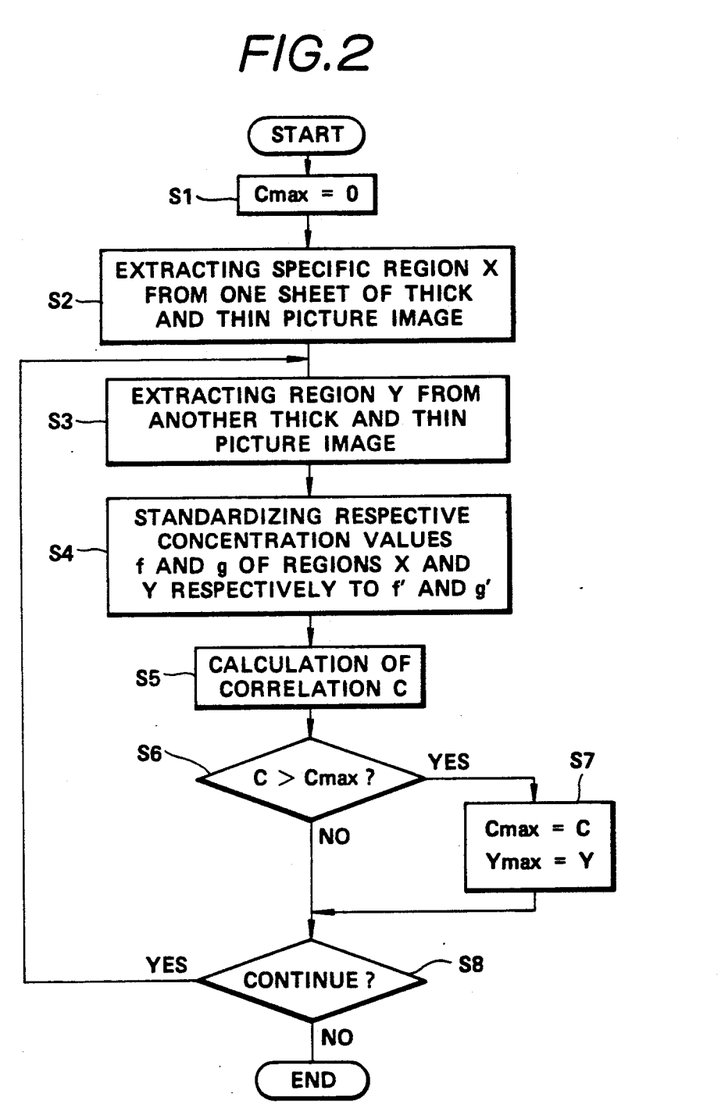
FIG. 2 is a flow chart showing the process of this embodiment.
Figure 3:
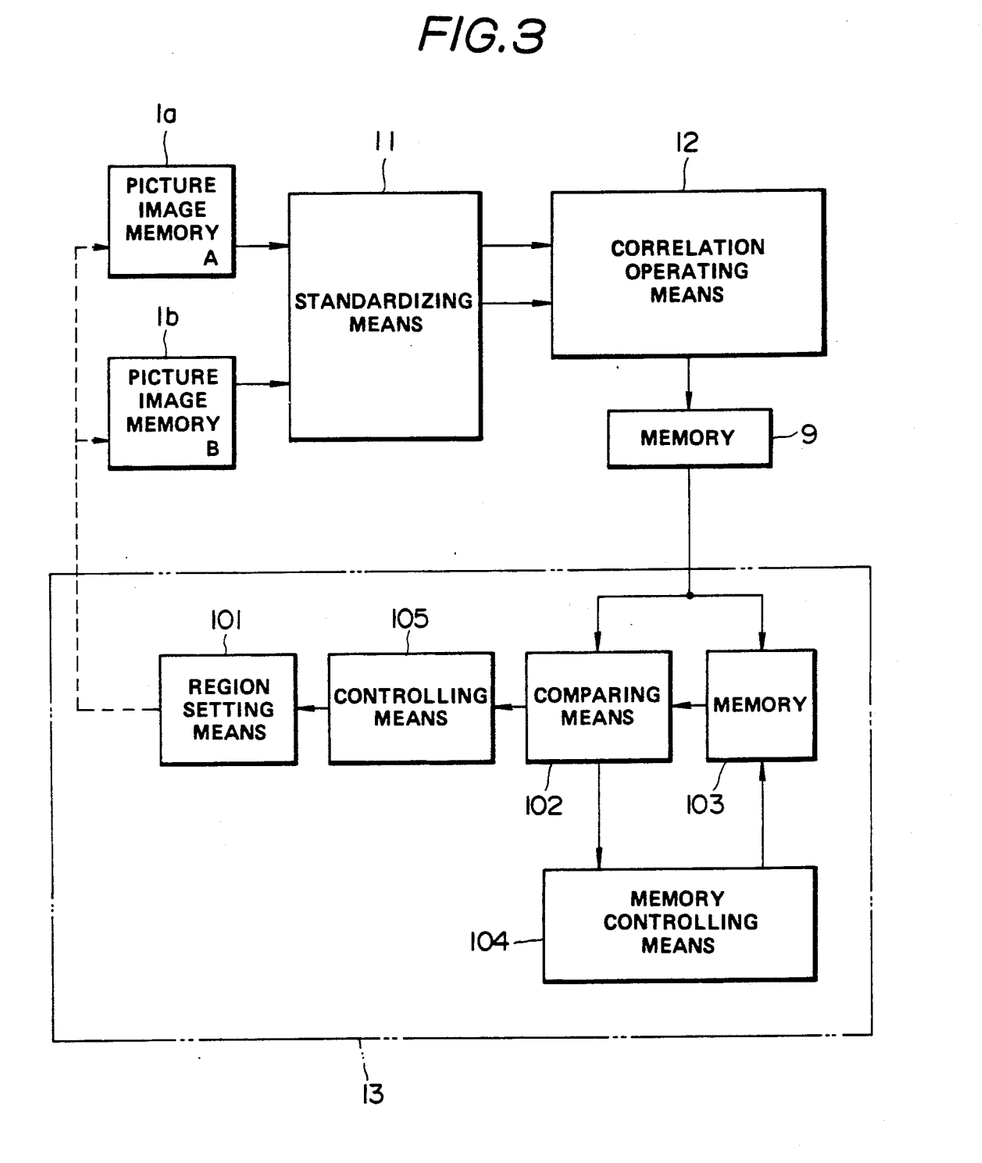
FIG. 3 is a functional block diagram showing the formation of a controller.

DETAILED DESCRIPTION OF THE PREFERRED EMBODIMENTS:

FIGS. 1 to 3 show the first embodiment of the present invention.

In FIG. 1, frames of different thick and thin picture images A and B are contained respectively in picture image memories 1$a$ and 1$b$. Operation object regions X and Y are set by a controller 13 respectively within these thick and thin picture images A and B so that standard deviations of $\sigma f$ and $\sigma g$ of concentration values (i.e., gray level or density) of f and g may be calculated respectively by standard deviation calculators $2a$ and $2b$ for the picture image signals of the respective set operation object regions X and Y.

The concentration values f and g of the picture image signals of the above mentioned set regions X and Y are extracted for the respective picture elements are are divided with the above mentioned standard deviations $\sigma f$ and $\sigma g$ respectively by dividers $3a$ and $3b$ so as to be standardized to values $f'=f/\sigma f$ and $g'=g/\sigma g$ in which the difference of the dispersion of the above mentioned concentration values f and g is corrected.

Outputs f' and g' from the above mentioned dividers $3a$ and $3b$ are delivered respectively to average operators $4a$ and $4b$ so that the averages $<f'>$ and $<g'>$ of the standardized concentration values f' and g' within the above mentioned set regions X and Y may be caluclated by these average operators $4a$ and $4b$. Further, these averages $<f'>$ and $<g'>$ are multiplied by the multiplier 5.

The outputs f' and g' from the above mentioned dividers $3a$ and $3b$ are multiplied by a multiplier 6 on one hand and further the average $<f'g'>$ of the product of the standardized concentration values f' and g' within the above mentioned set regions X and Y are calculated by an average operator 7.

The outputs $<f'>$ of the above mentioned multiplier 5 and the output $<f'g'>$ of the above mentioned average operator 7 are subtracted by a subtracter 8 and the output $<f'g'>-<f'><g'>$ of this subtracter 8 is contained in a memory 9.

In this embodiment, there is formed a standardizing means 11 standardizing the respective concentration values of f and g in the operation object regions X and Y of the plurality of picture images A and B by the above mentioned standard deviation calculators $2a$ and $2b$ and dividers $3a$ and $3b$ to values $f'(=f/\sigma f)$ and $g'(=g/\sigma g)$ in which the difference between the dispersions of the concentration values f and g is corrected. Also, there is formed a correlation operating means 12 operating the correlation in the actual field from the standardized concentration values f' and g' by athe above mentioned average operators $4a$ and $4b$, multiplier 5, multiplier 6, average operator 7 and subtracter 8.

If the output of the above mentioned subtracter 8 contained in the above mentioned memory 9 is represented by C, this output C will be represented by $C=<f'g'>-<f'><g'>$. This represents the correlation of f' and g'.

This correlation C is compared in size with the correlation of a different set of the set regions X and Y of the above mentioned picture image memories $1a$ and $1b$ by the controller 13 as a corresponding region detecting means. The set of the regions X and Y in which the above mentioned correlation C is a maximum is detected as corresponding regions.

The above mentioned controller 13 is formed as shown, for example, in FIG. 3.

That is to say, the above mentioned controller 13 comprises a region setting means 101 setting the operation object regions X and Y for the picture image memories $1a$ and $1b$, a comparing means 102 comparing the correlation C operated by the correlation operating means 12 with a reference value $C_{max}$, a memory 103 capable of storing the above mentioned reference value $C_{max}$ and the address, for example, of the operation object region Y, a memory controlling means 104 inputting the output of the above mentioned comparing means 102 and controlling the above mentioned memory 103 so that, only in case the above mentioned correlation C is larger than the above mentioned reference value $C_{max}$, the above mentioned correlation C as a new reference value $C_{max}$ and the address of the operation object region Y then as a new address may be stored by the above mentioned memory 103. A controlling means 105 controls the above mentioned region setting means 101 so that, in order to obtain the correlation C in the operation object regions X and Y of a different combination, after comparing the above mentioned correlation C and reference value $C_{max}$ with each other by the above mentioned comparing means 102, one Y of the above mentioned operation object regions X and Y may be changed.

The process of this embodiment shall be explained in the following with reference to FIG. 2.

First of all, in step S1 in FIG. 2, 0 is substituted as a reference value $C_{max}$ in the memory 103 of the controller 13.

Then, in step S2, the specific set region X is extracted from one sheet of the thick and thin picture images A of a plurality of thick and thin picture images A and B stored in the picture image memories $1a$ and $1b$. The step S3, the set region Y is extracted to detect the region corresponding to the above mentioned specific set region X from the other sheet of the thick and thin picture image B.

Then, in step S4, the standard deviations $\sigma f$ and $\sigma g$ of the concentration values f and g are calculated for the respective picture image signals of the above mentioned regions X and Y by the standard deviation calculators $2a$ and $2b$. The thickness values f and g of the picture image signals of the above mentioned regions X and Y are extracted for the respective picture elements and are divided by the above mentioned standard deviations $\sigma f$ and $\sigma g$ respectively by the dividers $3a$ and $3b$ to be standardized to $f'=f/\sigma f$ and $g'=g/\sigma g$.

Then, in step S5, the correlation $C=<f'g'>-<f'><f'>$ in the actual field of the above mentioned regions X and Y is determined by the correlation operating means comprising the average operators $4a$ and $4b$, multiplier 5, multiplier 6, average operator $4a$ and $4b$, multiplier 5, multiplier 6, average operator 7 and subtractor 8 from the standarized concentration values f' and g'. This correlation C is stored in the memory 9.

Then, in step S6, the above mentioned correlation C and the reference value $C_{max}$ stored in the memory 103 are compared with each other by the comparing means 102. Only in case the correlation C is larger than the reference value $C_{max}$, in step S7, by the memory controlling means 104, the above mentioned correlation C as a new reference value $C_{max}$ and the address Y of the operation object region then as a new address $Y_{max}$ are stored in the memory 103.

Then, in step S8, whether the process is to be continued or not is determined and, in case the process is to be continued, in step S3, by the controlling means 105, the region X of the picture image A is made invariable and the region Y of the picture image B is changed. Then, the process in and after step S3 is processed.

Thus, by repeating the process in and after step S3 the making the region X of the picture image A is made invariable and the region Y of the picture image B is changed. The, the process in and after step S3 is processed.

Thus, by repeating the process in and after step S3 the making the region X of the picture image A invariable and by changing the region Y of the picture image B in the above mentioned memory 103, the maximum value of the correlation C, as a reference value $C_{max}$, and the address of the region Y, in which the correlation C is a maximum as an address $Y_{max}$, are stored.

Thus, in the case that, the region X of the picture image A is made invariable and the region Y of the picture image B is changed by the controller 13 the correlations C of the respective sets of the regions X and Y are compared with each other and the region Y in which this correlation C is a maximum is detected. By the above process, the region X of the picture image A can be detected out of the picture image B.

Thus, in this embodiment, the differences of the dispersions of the concentration values are standardized to the corrected values f and g of the respective picture elements of the set regions X and Y of a plurality of thick and thin picture images A and B by the standard deviations $\sigma f$ and $\sigma g$ of the concentration values f and g in the above mentioned set regions X and Y and then the correlating operation is preformed. Therefore, when the correlating operation in the actual field in case, for example, one picture image is obscure, the difference of the dispersions of the concentration values f and g of both picture images A and B, which is a factor of reducing the precision, can be corrected and the corresponding region can be precisely detected by the simple means of the correlating operation in the actual field.

Figure 4:
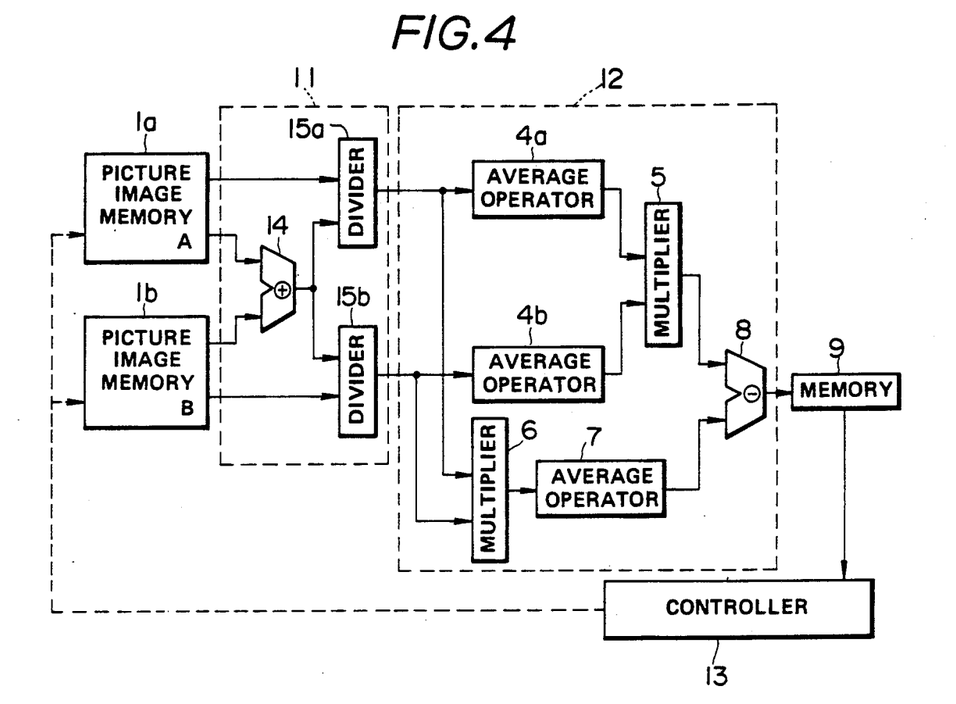
FIG. 4 is a formation diagram of a circuit realizing this embodiment.
Figure 5:
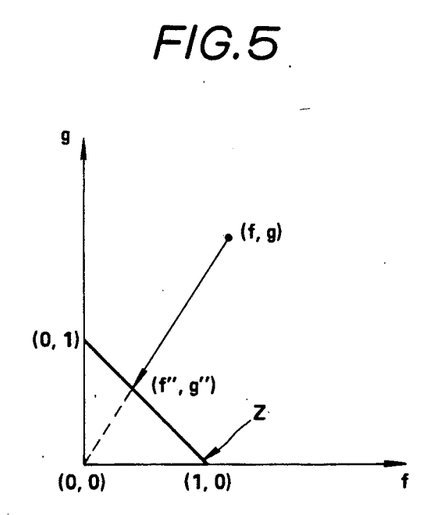
FIG. 5 is an explanatory diagram showing the standardization of the concentration value.

FIGS. 4 and 5 show the second embodiment of the present invention.

As shown in FIG. 4, in this embodiment, the concentration values f and g of the picture image signals of the respective set regions X and Y of the thick and thin picture images A and B stored in the picture image memories 1a and 1b are delivered for the respective picture elements to an adder 14 and the sum of f+g of the concentration values is calculated by this adder 14. The concentration values f and g of the picture image signals of the above mentioned set regions X and Y are delivered respectively also to dividers 15a and 15b and are divided by the sum of f+g of the above mentioned concentration values by these dividers 15a and 15b so as to be standardized to f''=f/(f+g) and g''=g/(f+g).

From these standardized concentration values f'' and g'', by the same operating process as in the above mentioned first embodiment, the correlation $C=<f''g''>-<f''><g''>$) in the actual field of the above mentioned regions X and Y is to be determined.

The other formations are the same as in the first embodiment.

Thus, in this embodiment, the concentration values f and g of the respective picture elements of the set regions X and Y of a plurality of thick and thin picture images A and B are divided by the sum f+g of these concentration values so as to be standardized and then the correlating operation is made. Dividing the above mentioned concentration values f and g by the sum f+g of the concentration values means that, as shown in FIG. 5, in the plane in which the concentration values of f and g are taken respectively on the axes intersecting at right angles, the point of the coordinates (f, g) is converted to a point (f'', g'') projected toward the origin (0, 0) onto a straight line Z connecting a point (0, 1) with a point (1, 0). By making this conversion, the difference of the concentration values f and g and the difference of the rates of the concentration variations of both picture images A and B, which are factors of reducing the precision when making the correlating operation in the actual field, can be corrected and the corresponding region can be precisely detected by the simple means of the correlating operation in the acutal field.

Figure 6:
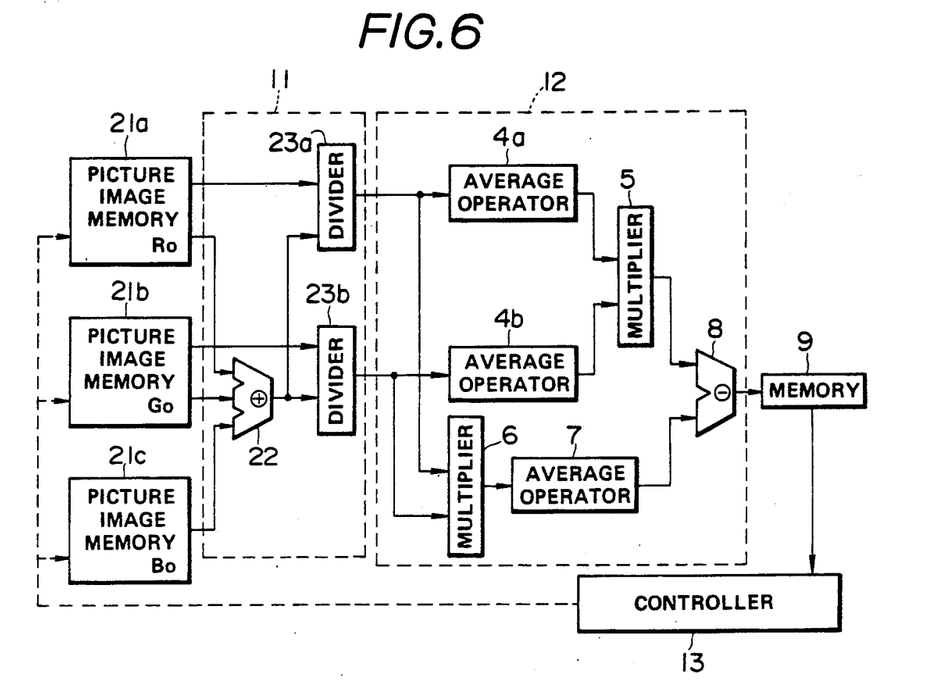
FIG. 6 is a formation diagram of a circuit realizing this embodiment.
Figure 7:
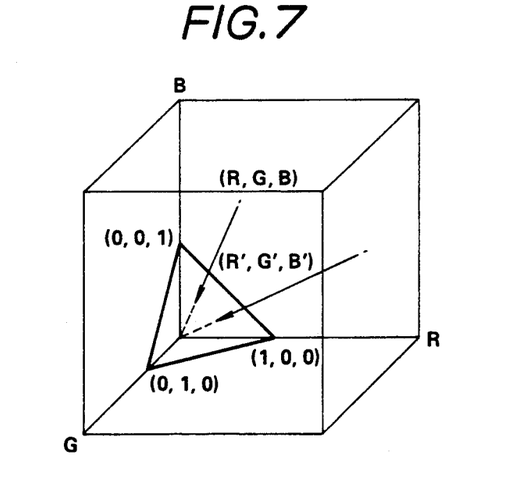
FIG. 7 is an explanatory diagram showing the standardization of the primary color values.
Figure 8:
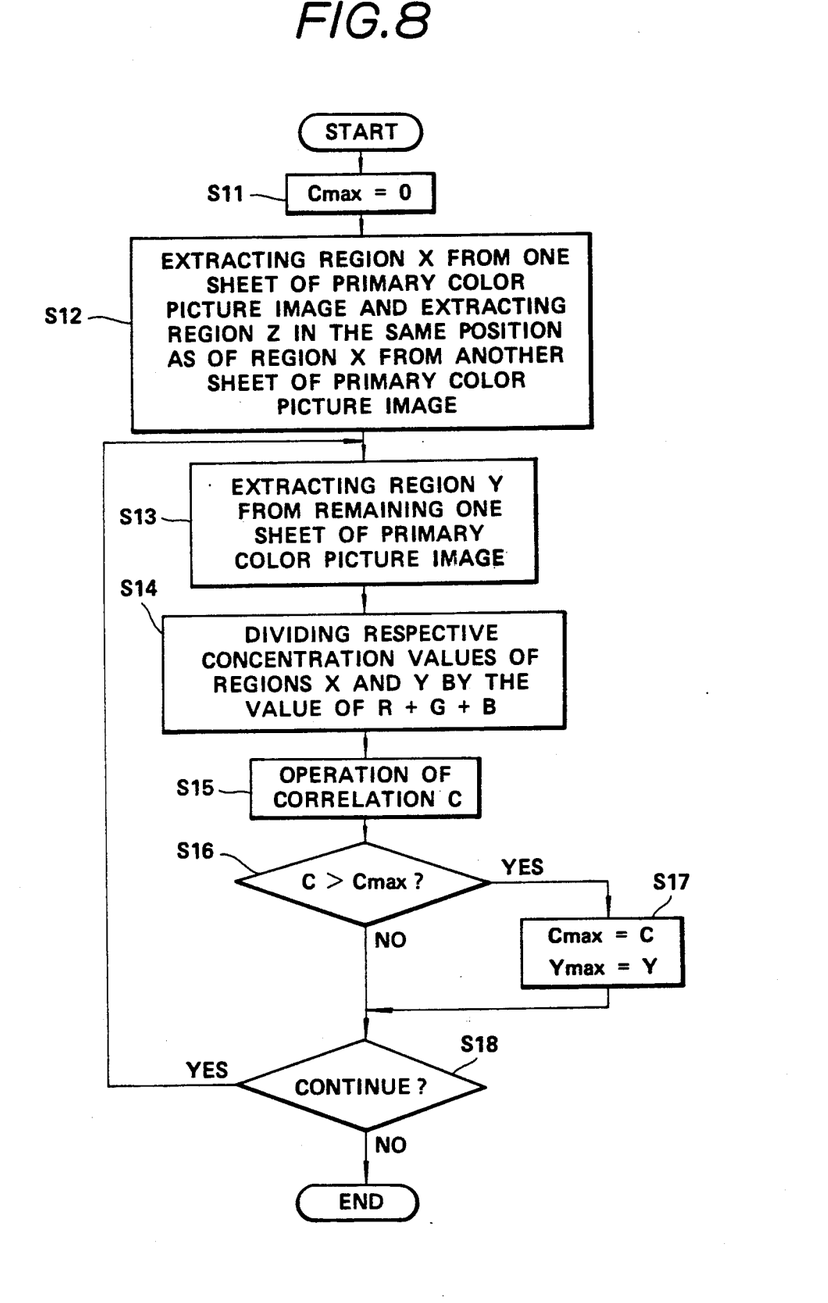
FIG. 8 is a flow chart showing the process of this embodiment.

FIGS. 6 to 8 show the third embodiment of the present invention.

In this embodiment, the present invention is applied to the case that the plurality of picture images are three primary color picture images of color picture images.

In FIG. 6, three primary color picture images $R_o$, $G_o$ and $B_o$ of color picture images are stored respectively in picture image memories 21a, 21b and 21c. Operation object regions X, Y and Z are set respectively within these three primary color picture images, the concentration values R, G and B of the picture signals of the respective set regions X, Y and Z are delivered to an adder 22 for the respective picture elements and the sum R+G+B of the concentration values is calculated by this adder 22. The concentration values R and G of the picture image signals of the above mentioned set regions X and Y are delivered respectively also to dividers 23a and 23b, are divided by the sum R+G+B of the above mentioned concentration values and are standardized to values R'=R/(R+G+B) and G'=G/(R+G+B) in which the influence of the brightness is corrected.

The outputs R' and G', from the above mentioned dividers 23a and 23b, are delivered respectively to average calculators 4a and 4b and the averages $<R'>$ and $<G'>$ of the standardized concentration values R' and G', within the above mentioned set regions X and Y, are calculated. Further, these averages $<R'>$ and $<G'>$ are multiplied by the multiplier 5.

The outputs R' and G' from the above mentioned dividers 3a and 3b are multiplied by the multiplier 6 on one hand and further the average $<R'G'>$ of the product of the standardized concentration values R' and G' within the above mentioned set regions X and Y are calculated by the average operator 7.

The outputs $<R'>$ and $<G'>$ of the above mentioned multiplier 5 and the output $<R'G'>$ of the above mentioned average operator 7 are subtracted by the subtracter 8 and the output $<R'G'>-<R'><G'>$ of this subtracter 8 is stored in the memory 9.

If the output of the above mentioned subtracter 8 stored in the above mentioned memory 9 is represented by C, this output C will be represented by $$C=<R'G'>-<R'><G'>$$

which represents the correlation of R' and G'.

This correlation C is compared in the size with the correlation C of a different set of the set regions X and Y of the above mentioned picture image memories 21a and 21b by the controller 13 as a corresponding region detecting means. The set of the regions X and Y, in which the above mentioned correlation C is a maximum, is detected as corresponding regions.

The process of this embodiment shall be explained in the following with reference to FIG. 8.

First of all, in step S1 in FIG. 8, 0 is substituted as a reference value $C_{max}$ in the memory 103 of the controller 13.

Then, in step S2, the specific set region X is extracted from one, for example, $R_o$ of the three primary color picture images $R_o$, $G_o$ and $B_o$ stored respectively in the picture image memories 21a, 21b and 21c and a region Z is set in the same position as of the above mentioned region X from another, for example, $B_o$. In the step S13, the set region Y is extracted from the remainig one, for example, $G_o$ in order to detect the region corresponding to the above mentioned region X. It is as if the three primary color picture images of color picture images were formed of the above mentioned regions X, Y and Z.

Then, in step S14, the sum $R+G+B$ of the concentration values are calculated from the concentration values R, G and B of the respective picture image signals of the above mentioned regions X, Y and Z by the adder 22. The concentration values R and G of the picture image signals of the above mentioned regions X and Y are extracted for the respective picture elements, are divided by the sum $R+G+B$ of the above mentioned concentration values respectively by the dividers 23a and 23b and are standardized to the values $R'=R/(R+G+B)$ and $G'=G/(R+G+B)$ in which the influence of the brightness is corrected.

Then, in step S15, the correlation $C=<R'G'> - <R'><G'>$ in the actual field of the above mentioned regions X and Y is determined from these standardized concentration values R' and G' by the correlation operating means 12 comprising the average operators 4a and 4b, multiplier 5, multiplier 6, average operator 7 and subtracter 8.

Then, in step S16, the above mentioned correlation C is compared in size with the reference value $C_{max}$ stored in the memory 103 by the comparing means 102. Only when the correlation C is larger than the reference value $C_{max}$, in step S17, the above mentioned correlation C as a new reference value $C_{max}$ and the address Y of the operation object region as a new address $Y_{max}$ are stored in the memory 103 by the memory controlling means 104.

Then, in step S18, whether the process is to be continued or not is determined. In the case of continuing it, in step S13, by the controlling means 105, the regions X and Z of the picture images $R_o$ and $B_o$ are made invariable and the region Y of the picture image $G_o$ is changed and then the process in and after the step S13 is processed.

By thus repeating the process in and after step S13, by making the regions X and Z of the picture images $R_o$ and $B_o$ invariable and by changing the region Y of the picture image $G_o$ in the above mentioned memory 103, the maximum value of the correlation C as a reference value $C_{max}$ and the address of the region Y in which the correlation C is maximum as an address $Y_{max}$ are stored.

Thus, the above process is repeated while making the region X of the above mentioned picture image $R_o$ invariable and changing the region Y of the picture image $G_o$. The correlations C of the respective sets of the regions X and Y are compared in size with each other by the controller 13. The region Y, in which the correlation C is a maximum, is detected. By the above process, the region Y, corresponding to the region X of the picture image $R_o$, can be detected from the picture image $G_o$.

Also, by detecting the region Z, corresponding to the region X of the picture image $R_o$, from the picture image $B_o$ by the same process as in the above, the set of the corresponding regions X, Y and Z can be detected.

Thus, in this embodiment, the sum $R+G+B$ of the concentration values of the respective picture elements of the set regions X, Y and Z of the three primary color picture images $R_o$, $G_o$ and $B_o$ of color picture images is calculated, the above mentioned concentration values R and G are divided by this sum $R+G+B$ of the concentration values and are standardized to the values R' and G' in which the influence of the brightness is corrected and then the correlating operation is made.

The significance of dividing the above mentioned concentration values R and G by the sum $R+G+B$ of the concentration values shall be explained with reference to FIG. 7. In FIG. 7, the respective concentration values R, G and B in the three regions of the picture elements located in the same positions in the regions X, Y and Z set within the three primary color picture images $R_o$, $G_o$ and $B_o$ are plotted as points of coordinates (R, G and B) in a space (which shall be temporarily called a color space) in which the concentration values of R, G and B are taken on three axes intersecting at right angles with one another. By dividing the point (R, G, B) in the above mentioned color space by the sum $R+G+B$ of the concentration values, the distribution of the point (R, G, B) within the above mentioned color space can be converted to a distribution of a point (R', G', B') projected toward the origin (0, 0, 0) onto a plane (which shall be temporarily called a color degree plane) passing through the three points of pionts (1, 0, 0), (0, 1, 0) and (0, 0, 1). It is known that, in the color picture image, the sum $R+G+B$ of the concentration values represents the brightness. It can be considered that the values R', G' and B' projected onto the above mentioned color degree plane have no information of brightness and represent hues and coloring degrees. Therefore, when the concentration values R, G and B of the three primary color picture images $R_o$, $G_o$ and $B_o$ are projected onto the color degree plane and are converted to R', G' and B' and then the correlating operation is made, influences of the brightness such as the illumination fluctuation and shadow, which are factors reducing the precision of the correlating operation, can be excluded and the corresponding region between the primary color picture images of the color images can be precisely detected by the simple means of the correlating operation in the acutal field.

Figure 9:
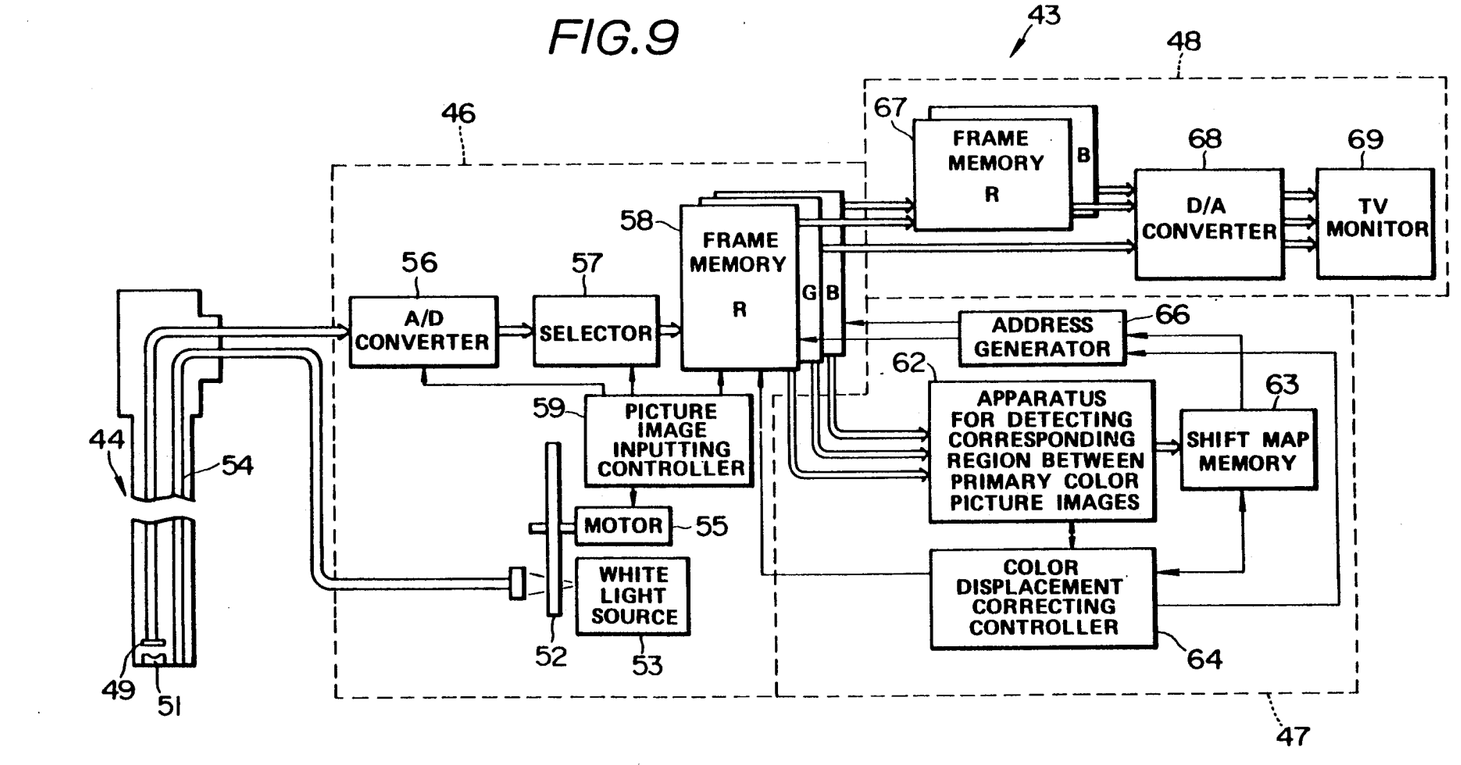
FIG. 9 is a block diagram of an endoscope apparatus realizing this embodiment.
Figure 10:
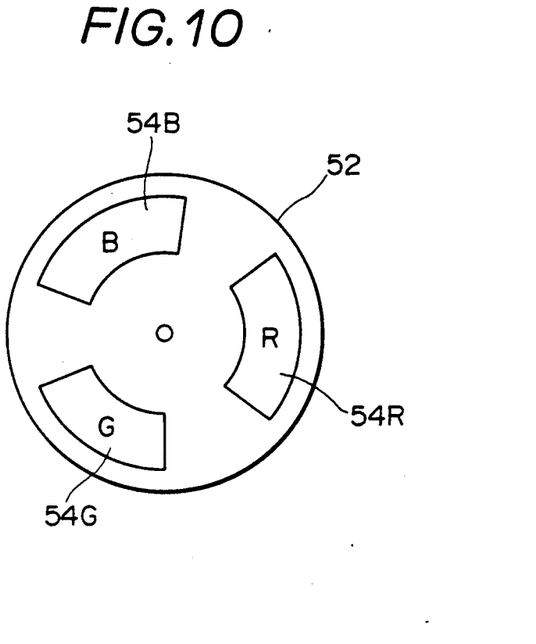
FIG. 10 is an elevation of a rotary filter.
Figure 11A:
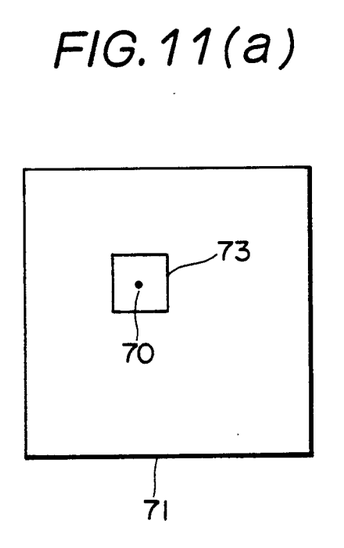
Figure 11B:
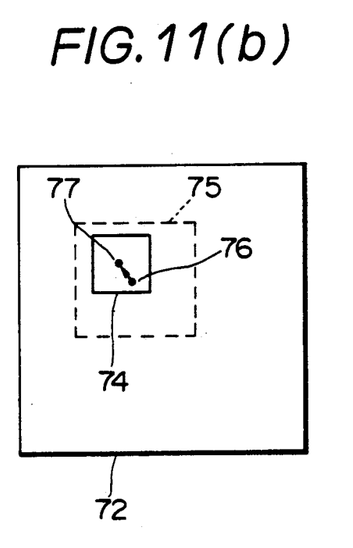

FIGS. 9 to 11 show the fourth embodiment of the present invention.

In the fourth embodiment of the present invention, an apparatus for detecting corresponding regions between picture images, as is shown in the first to third embodiments, is applied to an apparatus for correcting the color displacement of electronic endoscope picture images by a field sequential system.

In FIG. 9 showing the formation of this embodiment, an electronic endoscope apparatus 43 is formed as largely divided of an endoscope 44, picture image input apparatus 46, color displacement correcting apparatus 47 and picture image displaying apparatus 48.

A monochromatic solid state imaging device 49 such as a charge coupled device (CCD) is provided at the tip of the above mentioned endoscope 44 so that a picture image formed by an objective lens 51 may be formed on the imaging plane. An illuminating light is emitted from a white light source 53 such as a xenon lamp within the above mentioned picture image input apparatus 46, passes through a rotary filter 52 and is then radiated from the tip of the insertable part through a light guide 54 formed of an optical fiber bundle and inserted through the above mentioned endoscope 44.

Here, as shown in FIG. 10, the above mentioned rotary filter 52 is disk-like and has color passing filters 54R, 54G and 54B made to respectively pass spectra of red (R), green (G) and blue (B) arranged in the peripheral direction. When the above mentioned rotary filter 52 is driven at a rate of one rotation per 1/30 second by a motor 55 within the above mentioned picture image input apparatus 46, the white light will be converted to color light of R, G and B in a time order and the above mentioned solid state imaging device 49 will be able to take a monochromatic picture image of an oject eradiated with the color light of R, G and B.

The pictures image signal from the above mentioned solid state imaging device 49 is converted to a digital signal by an A/D converter 56 within the above mentioned picture image input apparatus 46 and is stored in a predetermined color region within a frame memory 58 by a selector 57.

A picture image input controller 59 provided within the above mentioned picture image input apparatus 46 is connected to the A/D converter 56, selector 57, frame memory 58 and motor 55 and controls the picture image signal of the object eradiated with the color light of R, G and B so as to be able to be stored in the respective frame memories 58.

The respective primary color picture images thus gradually accumulated in the above mentioned frame memories 58 are input into a primary color picture image corresponding region detecting device 62 formed of the device for detecting corresponding regions between picture images mentioned in the first to third embodiments of the present invention and the displacement of the R picture image or B picture image 72 from the G picture image 71 is detected for the respective picture elements and is recorded as a shift 76 in a shift map memory 63.

The above mentioned color displacement detecting operation is controlled by a color displacement correcting controller 64 provided within the color displacement correcting apparatus 47.

Then, in an address generator 66, on the basis of the shift 76 recorded in the above mentioned shift map memory 63, a correcting address correcting the R and B picture images is generated and is sent to the above mentioned frame memory 58.

The above mentioned frame memory 58 is to output a picture image signal of R or B based on the above mentioned correcting address to the frame memory 67 within the above mentioned picture image displaying device 48 by the instruction of the color displacement correcting controller 64. The G signal in the above mentioned frame memory 58 and R and B signals in the above mentioned frame memory 67 are input into a D/A converter 68, are converted to analog signals and are then displayed as color picture images by a TV monitor 69.

In this embodiment, the color displacement of the R picture image and color displacement of the B picture image are successively corrected by a set of color displacement correcting device 47. However, two sets of color displacement correcting devices for the R picture image and B picture image can be provided and connected in parallel to reduce the processing time.

Now, generally, in the field sequential system electronic endoscope, as described above, the illuminating light is changed to R, G and B color light within 1/30 second, the thick and thin picture images of the respective colors are successively input and the three primary color images are simultaneously output and displayed to thereby display the color picture images. However, in this system, when movement of the object or the endoscope itself is fast, the relative positions of the endoscope and object when the respective primary color picture images are imaged will be different. Thus, the reproduced picture image will be fogged or a colored edge will appeared and a so-called color displacement will occur. In this embodiment, in order to correct the color displacement, the apparatus 62 for detecting corresponding regions between color images shown in the first to third embodiments is used to detect the corresponding region between the primary color picture images.

In FIGS. 11(a) and 11(b), the color displacement of the digital picture image stored in the above mentioned frame memory 58 is corrected by an input method as is described above.

In the above mentioned apparatus 62 for detecting corresponding regions between primary color images, a small region 73 is set with each picture element 70 of the G picture image 71 among the three primary color picture images of R, G and B as a center. A small region 74 of the same size is set within the R picture image or B picture image 72. The correlation C, based on the system of the present invention, is calculated while moving the position of the small region 74 within a certain range 75. The set of the small region 73 of the G picture image 71 andd the small region 74 of the R picture image or B picture image 72 in which the correlation C is a maximum is determined and the shift amount 76 then is output in the shift map memory 63.

When applying the apparatus shown in the third embodiment, for example, when the first is to be determined, the correlation is operated on the small regions set with the respective picture elements located in the same positions within within the G picture image and B picture image as centers and the small region of the same size as of these set within the R picture image.

The R and B picture images 72 are re-formed on the basis of the thus determined shift amount 76 in each picture element 77 of the R or B picture image 72 and the color picture image corrected in the color displacement is output and displayed.

The shift amount 76 in each picture element 77 of the R and B picture images 72 is determined by a method as is described above on all the picture elements. However, the calculation amount may be reduced by a method wherein the shift amount is determined on the representative picture elements selected at fixed intervals and the shift amount is presumed by using a compensating method from those representative picture elements on the other picture elements.

According to this embodiment, a circuit of correcting the color displacement in the field sequential system electronic endoscope picture image within a short processing time can be realized by a comparatively simple circuit formation.

Figure 12:
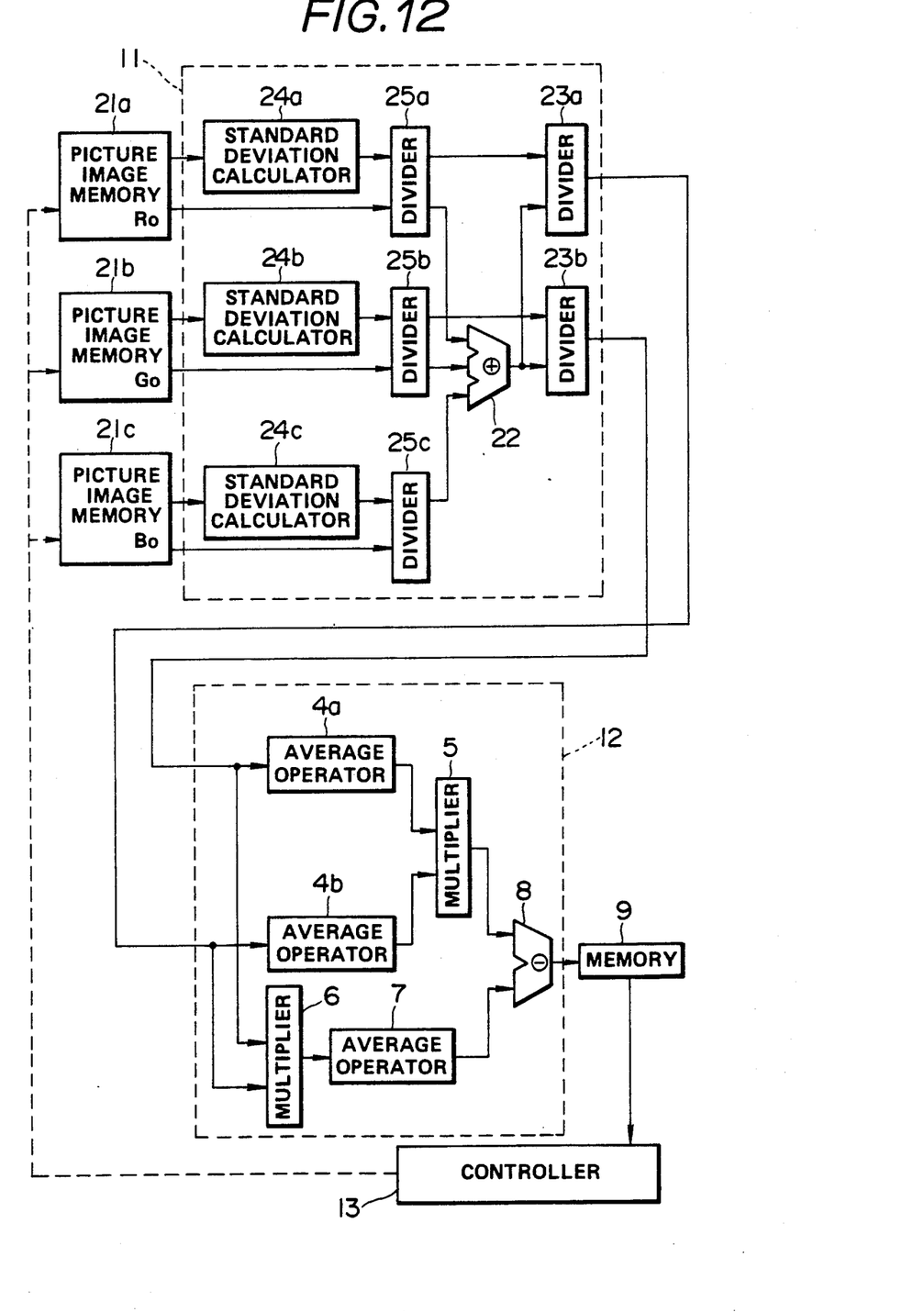
FIG. 12 is a formation diagram of a circuit realizing the fifth embodiment of the present invention.

FIG. 12 shows the fifth embodiment of the present invention.

In this embodiment, for the picture image signals of the respective set regions X, Y and Z of the three primary color picture images $R_o$, $G_o$ and $B_o$ stored respectively in the picture image memories 21a, 21b and 21c, the standard deviations $\sigma R$, $\sigma G$ and $\sigma B$ of the concentration values R, G and B are calculated by the standard deviation calculators 24a, 24b and 24c.

Also, the concentration values R, G and B of the picture image signals of the above mentioned set regions X, Y and Z are extracted from the respective picture elements, are divided respectively by the above mentioned standard deviations $\sigma R$, $\sigma G$ and $\sigma B$ by the repsective dividers 25a, 25b and 25c and are standardize to the values $R'=R/\sigma R$, $G'=G/\sigma G$ and $B'=B/\sigma B$ in which the difference of the dispersions of the above mentioned concentration values R, G and B is corrected.

The outputs from the above mentioned dividers 25a, 25b and 25c are delivered to the adder 22 for the respective picture elements and the sum $R'+G'+B'$ of the concentrations values standardized by this adder 22 is calculated. The outputs R' and G' from the above mentioned dividers 25a and 25b, are delivered also respectively to the dividers 23a and 23b, are divided by the sum $R'+G'+B'$ of the above mentioned standardized concentration values by these dividers 23a and 23b and are standarized to the values $R''=R'/(R'+G'+B')$ and $G''=G'/(R'+B'+G')$ in which the influence of the brightness is corrected.

The correlation $C=<R''G''>-<R''><G''>$ in the actual fields of the above mentioned regions X and Y is operated from these standardized concentration values R'', G'' and B'' by the same correlation operating means 12 as in the above mentioned embodiment.

The above process is repeated the same as in the above mentioned third embodiment while making the region X of the picture image $R_o$ invariable and varying the region Y of the pictures image $G_o$. The correlations C of the respective sets of the regions X and Y are compared in the size by the controller 13 and the region Y in which this correlation C is a maximum is detected.

Thus, in this embodiment, the concentration values R and G of the respective picture elements of the set regions X and Y of the picture images $R_o$ and $G_o$ are standardized to the values R'' and G'' in which both of the dispersion of the concentration values and the influence of the brightness are corrected in making the correlating operation. Therefore, according to this embodiment, the influence of the difference of the dispersion of the concentration values and the difference of the brightness, which are factors of reducing the precision, can be eliminated and the corresponding regions between the primary color picture images of color picture images can be precisely detected.

The present invention can be applied not only to the detection of the corresponding regions between a plurality of picture images correlated with the form distribution in the actual field but also, for example, to the detection of whether a specific object exists in the picture image and to the detection of the position in which the specific object is located in the picture image in case it exists.

As explained above, according to the present invention, the respective concentration values in the operation object regions of a plurality of picture images are standardized so that an influence of the dispersion of the concentration and brightness may be corrected and then the correlating operation is made so that the influence of the concentration and brightness, which are factors of reducing the precision of the correlating operation in the actual field, can be reduced and the corresponding region can be detected with high precision.

In this invention, it is apparent that working modes different in a wide range can formed on the basis of this invention without departing from the spirit and scope of the invention. This invention shall not be restricted by its specific working mode except being limited by the appended claims.

What is claimed is:

1. A method of correcting color displacement of electronic endoscope picture images by a field sequential system comprising respective steps of:
    setting a first operation object region, with a picture element as a center, for each picture element of one of three primary color picture images;
    setting a second operation object region for detecting a region corresponding to said first operation object region for two other picture images of the three primary color picture images;
    standardizing density values of respective picture elements in said first and second operation object regions so that an influence of dispersion of the density values of picture elements in said three primary color picture images and the brightness of said three primary color picture images as a whole may be corrected;
    determining a correlation in actual fields of said operation object regions from said density values standardized in accordance with said above standardizing step;
    comparing the respective correlation values in a plurality of sets of the operation object regions obtained by changing said second operation object region and detecting a set of operation object regions in which the correlation value, as determined in the above step, is a maximum;
    detecting a displacement between the operation object regions in which the correlation value is the maximum; and
    correcting an address of the picture element in a center of the second operation object region when the correlation value is the maximum.

2. A method of correcting color displacements of an electronic endoscope by a field sequential system comprising respective steps of:
    setting first and second operation object regions, with a picture element as a center, for each picture element respectively for two of three primary color picture images;
    setting a third operation object region for detecting operation object regions corresponding to said first and second operation object regions for the third of the three primary color picture images;
    standardizing density values of respective picture elements in the first, second and third operation object regions of the three primary color picture images so that an influence of dispersion of density values of picture elements of the three primary color picture images and brightness of the three primary color picture images as a whole may be corrected;
    determining a correlation in actual fields of said operation object regions from said density values standardized in accordance with above standardizing step;
    comparing respective correlation values in a plurality of sets of operation object regions obtained by changing said third operation object region and detecting a set of operation object regions in which the correlation value, as determined in the above step, is a maximum;
    detecting a displacement between the operation object regions in which the correlation value is the maximum; and
    correcting an address of the picture element in a center of the third operation object region when the correlation value is the maximum.

3. An apparatus for detecting corresponding regions between picture images comprising:
- a picture image memorizing means for storing a plurality of picture images;
- a region setting means, connected to said picture image memory means, for setting respective operation object regions for respective picture images stored in said picture image memorizing means;
- a standardizing means, connected to said picture image memorizing means, for standardizing density values of respective picture elements in the operation object regions of respective picture images set by said region setting means so that an influence of dispersion of density values of said picture elements in said plurality of picture images and brightness of said picture images as a whole may be corrected;
- a correlation operating means connected to said standardizing means, for determining a correlation in actual fields of said operation object regions from the density values standardized by said standardizing means;
- a comparing means, connected to said correlation operating means, for comparing correlation values determined by said correlation operating means with a reference value;
- a memorizing means, connected to said correlation operation means and said comparing means, for storing said reference value and addresses of the operation object regions;
- a memory controlling means, connected to said comparing means and said memorizing means, for controlling said memorizing means to store said correlation value as a new reference value only when an output of said comparing means is input and when said correlation value is larger than said reference value and to then store the address of the operation object region as a new address; and
- a controlling means, connected to said comparing means and said region setting means, for controlling said region setting means to change one of said operation object regions after comparing said correlation values with said reference value by said comparing means in order to obtain a correlation value in a different combination of operation object regions.

4. An apparatus for detecting corresponding regions between three primary color picture images of color picture images comprising:
- a picture image memorizing means for storing three primary color picture images;
- a region setting means, connected to said picture image memorizing means, for setting respective operation object regions for respective picture images stored in said picture image memorizing means;
- a standardizing means, connected to said picture image memory means, for standardizing density values of respective picture elements in the operation object regions of the respective picture images set by said region setting means so that an influence of dispersion of density values of said picture elements of said respective picture images and brightness of said respective picture images as a whole may be corrected;
- a correlation operating means connected to said standardizing means, for determining a correlation in actual fields of said operation object regions from the density values standardized by said standardizing means;
- a comparing means, connected to said correlation means, for comparing correlation values determined by said correlation operating means with a reference value;
- a memorizing means, connected to said correlation means and said comparing means, for storing said reference value and addresses of the operation object regions;
- a memory controlling means, connected to said memorizing means and said comparing means, for controlling said memorizing means to store said correlation value as a new reference value only when an output of said comparing means is input and said correlation value is larger than said reference value and an address of the reference object region is then stored as a new address; and
- a controlling means, connected to said comparing means and said region setting means, for controlling said region setting means to change one of said operation object regions after said correlation values are compared with the reference value by said comparing means in order to obtain a correlation value in a different combination of operation object regions.

5. An apparatus for correcting color displacements of electronic endoscope picture images by a field sequential system comprising:
- a region setting means for setting a first operation object region, with a picture element as a center, for each picture element for one of three primary color picture images and setting a second operation object region to detect a region corresponding to said first operation object region for the two other picture images of the three primary color picture images;
- a standardizing means, connected to said region setting means, for standardizing density values of respective picture elements in the first and second operation object regions set by said region setting means;
- a correlation operating means, connected to said standardizing means, for determining a correlation in actual fields of said operation object regions from the density values standardized by said standardizing means;
- a corresponding region detecting means, connected to said correlation operation means, for detecting a set of operation object regions in which a correlation value is a maximum by comparing respective correlation values in a plurality of sets of the operation object regions obtained by changing the second operation object region by said region setting means;
- a detecting means, connected to said corresponding region detecting means, for detecting a displacement between operation object regions in which the correlation value detected by said corresponding region detecting means is the maximum;
- memorizing means, connected to said detecting means, for storing a displacement detected by said detecting means; and
- an address correcting means, connected to said memorizing means and said region setting means, for correcting an address of the picture element in a center of the second operation object region when the correlation value is the maximum based upon the displacement stored in said memorizing means.

6. An apparatus for correcting color displacement of an electronic endoscope picture image by a field sequential system comprising:
- a region setting means for setting first and second operation object regions, with a picture element as a center, for each picture element respectively for one of two picture images of three primary color picture images and setting a third operation object region for detecting regions corresponding to said first and second operation object regions for another one of the picture images of the three primary color picture images;
- a standardizing means, connected to said region setting means, for standardizing density values of respective picture elements in the operation object regions of the three primary color picture images set by said region setting means so that an influence of dispersion of density values of the picture elements for said three primary color picture images and brightness of said three primary color picture images as a whole may be connected;
- a correlation operating means, connected to said standardizing means, for determining a correlation in actual fields of said operation object regions from the density values standardized by said standardizing means;
- a corresponding region detecting means, connected to said correlation operatioin means, for comparing respective correlation values in a plurality of the operation object regions obtained by changing the third operation object region by said region setting means and detecting a set of operation object regions in which the correlation value is a maximum;
- a detecting means, connected to said corresponding region, for detecting a displacement between the operation object regions in which the correlation value detected by said corresponding region detecting means is the maximum;
- a memorizing means, connected to said detecting means, for storing the displacement detected by said detecting means; and
- an address correcting means, connected to said memorizing means and said region setting means, for correcting the address of the picture element in a center of the third operation object region when the correlation value is the maximum based upon the displacement stored in said memorizing means.

7. An electronic endoscope apparatus of a field sequential system comprising:
- an endoscope having an illuninating means for sequentially radiating light of different colors onto an object to be imaged and an imaging means for imaging object images corresponding to illuminating light of respective colors by said illuminating means;
- a first memorizing means, connected to said endoscope, for storing respective three primary color picture images imaged by said imaging means;
- a region setting means, connected to said first memorizing means, for setting respective operation object regions for the three primary color picture images stored in said first memorizing means;
- a standardizing means, connected to said region setting means, for standardizing density values of respective picture elements in the operation object regions of the three primary color picture images set by said region setting means so that an influence of dispersion of density vallues of said picture elements of the three primary color picture images and brightness of the three primary color picture images as a whole may be corrected;
- a correlation operating means, connected to said standardizing means, for determining a correlation in actual fields of said operation object regions from the density values standardized by said standardizing means;
- a corresponding region detecting means, connected to said correlation operating means, for detecting a set of operation object regions in which a correlation value determined by said correlation operating means is a maximum;
- a detecting means, connected to said corresponding region detecting means, for detecting a displacement between the operation object regions in which the correlation value detected by said corresponding region detecting means is the maximum;
- an address correcting means, connected to said detecting means, for correcting addresses of said three primary color picture images based upon the displacement detected by said detecting means;
- a second memorizing means, connected to said address correcting means, for storing the picture images having had addresses corrected by said address correcting means; and
- a signal processing means, connected to said first and second memorizing means, for reading picture images with corrected addresses out of said second memorizing means and for reading picture images, not having addresses corrected, out of said first memorizing means and for forming video signals having corrected color displacement.

8. An apparatus for detecting corresponding regions between a plurality of picture images, comprising:
- a picture image memorizing means for storing a plurality of picture images;
- a region setting means, connected to said picture image memorizing means, for setting respective operation object region for respective picture images stored in said picture image memorizing means;
- a standardizing means, connected to said picture image memorizing means, for standardizing density values of respective picture elements in operation object regions of respective picture images set by said region setting means so that an influence of dispersion of density values of picture elements in said plurality of picture images and brightness of a picture image as a whole may be corrected;
- a correlation operating means, connected to said standardizing means, for determining a correlation in actual fields of said operation object regions from the density values standardized by said standardizing means; and
- a corresponding regions detecting means, connected to said correlation operating means and said region setting means, for comparing respective correlation values in a plurality of sets of operation object regions obtained by altering one of said operation object regions and detecting a set of said operation object regions in which the correlation value is a maximum and said set being corresponding regions.

9. An apparatus for detecting corresponding regions between three primary color picture images of a color picture image, comprising:
- a picture image memorizing means for storing three primary color picture images of a color picture image;
- a region setting means, connected to said picture image memorizing means, for setting respective operation object regions for respective picture images stored in said picture image memorizing means;
- a standardizing means, connected to said picture image memorizing means, for standardizing density values of respective picture elements in operation object regions of respective picture images set by said region setting means so that an influence of dispersion of density values of picture elements in said plurality of picture images and brightness of a picture image as a whole may be corrected;
- a correlation operating means, connected to said standardizing means, for determining a correlation in actual fields of said operation object regions from density values standardized by said standardizing means; and
- a corresponding regions detecting means, connected to said correlation operating means and said region setting means, for comparing respective correlation values in a plurality of sets of operation object regions obtained by altering one of said operation object regions and detecting a set of said operation object regions in which the correlation value is a maximum and said set being the corresponding regions.

10. An apparatus according to claim 3 or 8 wherein said standarizing means comprises a first calculating means for calculating standard differences of the density values in respective operation object regions and a seond calculating means for standardizing the density values of respective picture elements of respective operation object regions by dividing the same by a standard difference of the density values in respective operation object regions.

11. An apparatus according to claim 8 wherein said standardizing means comprises a first calculating means for calculating standard differences of the density values in respective operation object regions and a second calculating means for standardizing the density values of respective picture elements of respective operation object regions by dividing the same by a standard difference of the density values in respective operation object regions, said correlation operating means comprises a third calculating means for calculating an average of products of the density values after standardization of the picture elements located in the same position designated by said picture image memorizing means for two operation object regions, a fourth calculating means for calculating the average product of the density values after standardization of both operation object regions and a fifth calculating means for subtracting the average product of the density values after said standardization from the average of the products of the density values after said standardization.

12. An apparatus according to claim 8 wherein said standardizing means comprises a calculating means for standardizing respective density values of the picture elements located in the same position designated by said memorizing means for respective operation object regions by dividing the same by a sum of respective density values of the picture elements located in the same positions in respective operation object regions.

13. An apparatus according to claim 12 wherein said correlation operating means comprises a first calculating means for calculating an average of products of the density values after the standardization of the picture elements located in the same position designated by said picture image memorizing means for two operation object regions, a second calculting means for calculating a product of averages of the density values after the standardization of both operation object regions and a third calculating means for substracting an average product of the density values after said standardization from the average of the products of the density values after said standardization.

14. An apparatus according to claim 8 wherein said standardizing means comprises a first calculating means for standardizing the density values of respective operation object regions by dividing the same by a sum of respective density values of the picture elements located in the same position designated by said picture image memorizing means for respective operation object regions.

15. An apparatus according to claim 14 wherein said correlation operating means comprises a second calculating means for calculating an average of products of the density values after the standardization of the picture elements located in the same position designated by the picture image memorizing means for two operation object regions, a third calculating means for calculating an average product of the density values after the standardization of both operation object regions and a fourth calculating means for subtracting the average product of the density values after said standardization from the average of the products of the density values after said standardization.

16. An apparatus according to claim 4 or 9 wherein said standarizing means comprises a first calculating means for calculating a standard deviation of the density values in respective operation object regions, a second calculating means for dividing the density values of respective picture elements in the operation object regions of the three primary color picture images by a standard deviation of the density values in respective operation object regions and a third calculating means for standardizing the density values divided by said standard deviation by dividing the same by a sum of the density values divided by said standard deviation.

17. An apparatus according to claim 9 wherein said standardizing means comprises a first calculating means for calculating a standard deviation of the density values in respective operation object regions, a second calculating means for dividing the density values of respective picture elements in the operation object regions of the three primary color picture images by a standard deviation of the density values in respective operation object regions and a third calculating means for standardizing the density values divided by said standard deviation by dividing the same by a sum of the density values divided by said standard deviation, said correlation operating means comprises a fourth calculating means for calculating an average of products of the density values after standardization of the picture elements locted in the same position designated by said picture image memorizing means for two operation object regions, a fifth calculating means for calculating an average product of the density values after the standardization of both operation object regions and a sixth calculating means for subtracting the average product of the density values after said standardization from the average of the products of the density values after said standardization.

* * * * *